United States Patent [19]

Blount

[11] 4,153,768
[45] May 8, 1979

[54] ORGANIC HYDROXY SILICATES UTILIZED AS CURING AGENTS FOR POLYURETHANE PREPOLYMERS

[76] Inventor: David H. Blount, 5450 Lea St., San Diego, Calif. 92105

[21] Appl. No.: 852,846

[22] Filed: Nov. 18, 1977

Related U.S. Application Data

[63] Continuation-in-part of Ser. No. 663,924, Mar. 4, 1976, Pat. No. 4,097,424, which is a continuation-in-part of Ser. No. 599,000, Jul. 7, 1975, Pat. No. 4,072,637, which is a continuation-in-part of Ser. No. 262,485, Jun. 14, 1972, abandoned, which is a continuation-in-part of Ser. No. 71,628, Sep. 11, 1970, abandoned.

[51] Int. Cl.² .............................................. C08G 18/00
[52] U.S. Cl. .............................. 521/155; 260/18 PT; 260/28 R; 260/33.6 UB; 260/37 N; 260/858; 260/859 R; 521/111; 521/117; 521/125; 521/126; 521/128; 521/129; 521/131; 521/130; 521/170; 528/11; 528/14; 528/26; 528/28; 528/44; 528/46; 528/53; 528/57; 528/58; 528/76; 528/79; 528/85
[58] Field of Search ...... 260/2.5 A, 2.5 AM, 2.5 AK, 260/2.5 AT, 2 S, 46.5 E, 46.5 G, 77.5 MA, 77.5 AM, 77.5 AN, 75 NT, 75 NK, 858, 859 R, 33.6 UB, 28 N, 37 N

[56] References Cited

U.S. PATENT DOCUMENTS

| | | | |
|---|---|---|---|
| 4,072,637 | 2/1978 | Blount | 260/2.5 A |
| 4,097,424 | 6/1978 | Blount | 260/2.5 A |

Primary Examiner—Melvyn I. Marquis

[57] ABSTRACT

Liquid isocyanate-terminated polyurethane prepolymers are cured by mixing them with 10% to 200% by weight, based on the weight of the prepolymer, of an organic hydroxy silicate compound or their condensation product. The cured material may be non-porous elastomeric products or fine cellular products.

21 Claims, No Drawings

The resultant polymerization mixture was stirred at a temperature of 30° C. for 60 minutes to polymerize the 1,3-butadiene. The resultant 1,2-polybutadiene was isolated by the same method as utilized in Example 1. The resultant polymer had an yield of 65.0%, a melting point of 125° C., a reduced specific viscosity of 1.40 and a content of 1,2-structure of 83.8%.

EXAMPLES 42 and 43

In each of Example 42 and 43, a one liter capacity glass separable flask, from which the inside atmospheric air had been drawn out and replaced by nitrogen gas, was charged with 500 ml of dehydrated liquid 1,3-butadiene. The dehydrated liquid 1,3-butadiene was mixed with 36 millimole of N,N-dimethylformamide and, then, with 1 ml of a monochlorobenzene solution containing 0.87 millimole of carbon disulfide, while the mixture was stirred at a temperature of 15° C. in Example 42 and 10° C. in Example 43. 22 ml of a monochlorobenzene solution containing 0.46 millimole of cobalt (III) acetyl acetonate, 1.83 millimole of triethylaluminium and 9 millimole of 1,3-butadiene was aged at a temperature of 25° C. for 5 minutes, and thereafter, admixed with the above-prepared mixture containing 1,3-butadiene, N,N-dimethylformamide and carbon disulfide. The resultant polymerization mixture was stirred at a temperature of 15° C. in Example 42 and 10° C. in Example 43, for 90 minutes to polymerize the 1,3-butadiene. The polymerization was stopped by adding dropwise 500 ml of methyl alcohol to the polymerization mixture. The resultant 1,2-polybutadiene was precipitated from the polymerization mixture and separated, washed, and dried by the same method as utilized in Example 1. The yields and properties of the resultant polymers are shown in Table 7.

Table 7

| | 1,2-polybutadiene | | | | |
|---|---|---|---|---|---|
| Example No. | Polymerization temperature (°C.) | Yield (%) | Melting point (°C.) | Reduced specific viscosity ($\eta$ sp/C) | Content of 1,2-structure (%) |
| Ex. 42 | 15 | 15 | 104 | 0.74 | 80.2 |
| "43 | 10 | 13 | 107 | 0.88 | 80.5 |

What we claim is:

1. A process for producing 1,2-polybutadiene comprising polymerizing 1,3-butadiene in the presence of a catalyst which has been prepared by admixing: (A) a catalyst component solution prepared by dissolving, in an organic solvent containing at least a portion of 1,3-butadiene to be polymerized, (a) at least one cobalt compound which is soluble in said organic solvent and (b) at least one organoaluminum compound of the formula (1)

$$AlR_3 \qquad (1)$$

wherein R represents an aliphatic hydrocarbon radical having 1 to 6 carbon atoms, an alicyclic hydrocarbon radical having 3 to 6 carbon atoms or phenyl radical; (B) N,N-dimethylformamide and; (C) carbon disulfide.

2. A process as claimed in claim 1, wherein said cobalt compound is selected from β-diketone complexes of cobalt, β-ketoester complexes of cobalt, cobalt salts of organic carboxylic acids having 6 to 15 carbon atoms and halogenated cobalt complexes of the formula (6)

$$CoX_l \cdot Y_m \qquad (6)$$

wherein X represents a halogen atom, Y represent a ligand of the cobalt atom, l represents an integer of 2 or 3 and m represents an integer of 1 to 4.

3. A process as claimed in claim 2, wherein said β-diketone complexes of cobalt have been prepared by using, as a ligand of the cobalt atom, a β-diketone of the formula (4)

wherein $R_5$ and $R_8$ represent an aliphatic hydrocarbon radical having 1 to 3 carbon atoms, respectively, and $R_6$ and $R_7$ represent a hydrogen atom or aliphatic hydrocarbon radical having 1 to 3 carbon atoms, respectively.

4. A process as claimed in claim 3, wherein said β-diketone complex of cobalt is selected from cobalt (II) acetylacetonate and cobalt (III) acetylacetonate.

5. A process as claimed in claim 2, wherein said β-ketoester complexes of cobalt have been prepared by using, as a ligand of the cobalt atom, a ketoester of the formula (5)

wherein $R_5$ and $R_8$ represent an aliphatic hydrocarbon radical having 1 to 3 carbon atoms, respectively, and $R_6$ and $R_7$ represent a hydrogen atom or aliphatic hydrocarbon radical having 1 to 3 carbon atoms, respectively.

6. A process as claimed in claim 5, wherein said ketoester complex of cobalt is a cobalt-acetoacetic ethyl ester complex.

7. A process as claimed in claim 2, wherein said cobalt salt of organic carboxylic acid is selected from cobalt octoate, cobalt naphthenate and cobalt benzoate.

8. A process as claimed in claim 2, wherein said ligand in said halogenated cobalt complexes is selected from tertiary amines, alcohols, tertiary phosphines and N,N-dialkylamides.

9. A process as claimed in claim 8, wherein said tertiary amine is selected from pyridine, triethyl amine, tributyl amine and dimethyl aniline.

10. A process as claimed in claim 8, wherein said alcohol is selected from methyl alcohol and ethyl alcohol.

11. A process as claimed in claim 8, wherein said tertiary phosphine is selected from triphenyl phosphine and tributyl phosphine.

12. A process as claimed in claim 8, wherein said N,N-dialkylamide is selected from N,N-dimethylformamide, N,N-dimethylacetamide and N,N-diethylformamide.

13. A process as claimed in claim 8, wherein said halogenated cobalt complex is selected from a complex of cobalt chloride with pyridine and a complex of cobalt chloride with ethyl alcohol.

14. A process as claimed in claim 1, wherein said organoaluminium compound is selected from trimeweight of water may be reacted with 0.5 to 6 parts by weight of a liquid isocyanate-terminated polyurethane prepolymer to produce a solid/solid fine cellular polyurethane product.

Any suitable polyisocyanate may be used to produce the liquid isocyanate-terminated polyurethane prepolymer, for example, arylene polyisocyanates such as tolylene, metaphenylene, 4-chlorophenylene-1,3-, methylene-bis-(phenylene-4-), biphenylene-4,4'-, 3,3'-dimethoxy-biphenylene-4,4'-, 3,3'-diphenylbiphenylene-4,4'-, naphthalene-1,5- and tetrahydronaphthalene-1,5-diisocyanates and triphenylmethane triisocyanate; alkylene polyisocyanates such as ethylene, ethylidene, propylene-1,2-, butylene-1,4-, butylene-1,3-, hexylene-1,6-, decamethylene-1,10-, cyclohexylene-1,2-, cyclohexylene-1,4-, and methylene-bis-(cyclohexyl-4,4'-) diisocyanates. Phosgenation product of aniline-formaldehyde condensation may be used. Polyisothiocyanate, inorganic polyisothiocyanates, polyisocyanates which contain carbodiimide groups as described in German Pat. No. 1,092,007 and polyisocyanates which contain urethane groups, allophanate groups, isocyanurate groups, urea groups, imide groups or biuret groups may be used to produce the liquid isocyanate-terminated polyurethane prepolymers.

SUMMARY OF THE INVENTION prepolymer or may be added at the time of curing and may be in the amount from 5% to 50% by weight, based on the prepolymer. Plasticizers may include benzoate ester, phthalate esters, dipropylene glycol benzoate, dodecyl phthalate and propylene glycol phthalate. Extenders such as high boiling coal tar distillates, mineral oil, poly (alpha-methyl styrene) polymers, mercapto-terminated liquid polysulfide polymers, paraffin oil and sulphonated castor oil may be used. Finely divided fillers such as alkali metal silicates, alkaline earth metal silicate, ammonium silicate, metal oxides, metal hydroxides, metal carbonates, chalk, heavy spar, gypsum, anhydrite, clay, kaolin, silica, and mixtures thereof may be used in this instant process.

In the production of certain foams, it is advisable to add blowing agents. These are inert liquids with boiling points ranging from $-25°$ to $80°$ C. and preferably from $-15°$ to $40°$. The organic blowing agents are used in quantities of from 2% to 30% by weight, based on the reaction mixture.

The organic blowing agents such as acetone, ethyl acetate, methanol, ethanol, halogenated alkanes, e.g. methylene chloride, chloroform, ethylidene chloride vinylidene chloride, monofluorotrichloromethane, chlorodifluoromethane, dichlorodifluoromethane, butane, hexane, heptane, diethylether, compounds which decompose at temperatures above room temperature compound and polymer containing 10 to 100%, by weight of water. The polyurethane prepolymer with 3 or more terminal isocyanate groups tend to produce cellular products when reacted with an organic hydroxy silicate compound and polymer containing 10% to 100% by weight of water. The polyurethane prepolymer, when reacted with an organic hydroxy silicate compound and polymer without water added, tends to produce non-porous products. Mixtures of polyurethane prepolymer with three and four terminal isocyanate groups and cured by reacting with an organic hydroxy silicate compound and polymer containing 10% to 100% by weight produce tough, strong, finely cellular, light weight polyurethane product which is useful for structural applications. The three and four terminal isocyanate groups may be mixed to contain from 20% to 80% by weight of the prepolymer having three isocyanate groups, and from 80% to 20% by weight of the prepolymer having four isocyanate groups.

The object of the present invention is to provide a novel method of curing liquid isocyanate-terminated polyurethane prepolymers. Another object and advantage of the present invention is to utilize low cost and ready availability of organic hydroxy silicate compounds and their condensation products to cure urethane prepolymers. Another object is to produce relatively low cost elastomeric and foamed polyurethane polymers having good physical properties. Another object of the present invention is to produce polyurethane polymers with improved flame resistant properties. Still a further object to provide novel relatively low cost, rigid, fine cellular, light-weight polyurethane polymers which may be used for structural purposes. Still another object is to produce novel polyurethane polymers that are soluble in organic solvent and may be utilized as coating agents for wood and metal.

DESCRIPTION OF PREFERRED EMBODIMENT

My invention will be illustrated in greater detail by the specific examples which follow, it being understood that these preferred embodiments are illustrative of, but not limited to, procedures which may be used in the production of polyurethane polymer utilizing organic hydroxy silicates as the curing agent. Parts and percentages are by weight unless otherwise indicated.

EXAMPLE I

About equal parts by weight of fine granular hydrated silica and glycerol are mixed, then 5% by weight of sodium carbonate, percentage based on the weight of the hydrated silica and glycerol, is added. The mixture is then heated to just below the boiling point of glycerol for 20 to 30 minutes while agitating at ambient pressure, thereby producing brown granules of glycerol silicate. On further heating of the glycerol silicate at a temperature just below the boiling point of glycerol for 10 to 30 minutes, the glycerol silicate granules soften, then form a brown poly(glycerol silicate) polymer.

The mixture of glycerol silicate and poly(glycerol silicate) polymer were analyzed by Infrared KBr disc analysis and it showed evidence that the hydrated silica reacted chemically with the glycerol.

About 2 parts by weight of a liquid isocyanate-terminated polyurethane prepolymer, which was produced by mixing about equal parts by weight of toluene diisocyanate (80% 2,4-isomer and 20% 2,6-isomer) and polyethylene glycol (380–420 mol wt.) and 1 part by weight of the said mixture of glycerol silicate and poly(glycerol silicate) polymer, containing about 10% water by weight, are mixed. The mixture is gently agitated at ambient temperature for 5 to 15 minutes until the mixture begins to expand. The mixture expands 8 to 10 times its original volume and is cured within 30 to 60 minutes, thereby producing a white, rigid, tough polyurethane foam.

EXAMPLE II

About equal parts by weight of the mixture of glycerol silicate and poly (glycerol silicate) polymer as produced in Example I and water are mixed. Then equal parts by weight of the polyurethane prepolymer produced in Example I are mixed. The mixture is then gently agitated for 5 to 15 minutes until it begins to expand. The mixture expands 4 to 6 times its original volume, thereby producing a tough semirigid foam in 30 to 60 minutes.

EXAMPLE III

About 1 part by weight of the mixture of glycerol silicate and poly (glycerol silicate) polymer as produced in Example I and 0.5 part by weight of water are mixed, then equal parts by weight of the polyurethane prepolymer as produced in Example I are mixed. The mixture is gently agitated for 5 to 15 minutes until it begins to expand. The mixture expands 4 to 6 times its original volume, thereby producing a tough, elastic, semirigid, foam and is cured in 30 to 60 minutes.

EXAMPLE IV

About equal parts by weight of castor oil and toluene diisocyanate (80% 2,4-isomer and 20% 2,6-isomer) are mixed and agitated gently until the chemical reaction has stopped, thereby producing a polyurethane prepolymer.

About 2 parts by weight of the polyurethane prepolymer as produced above and 1 part by weight of a catalyst, an aqueous solution of the mixture of glycerol silicate and poly(glycerol silicate) polymer as produced in Example I containing 25% by weight of water, are mixed. The mixture is gently agitated for 5 to 15 minutes until it begins to expand. The mixture expands 6 to 8 times its original volume, thereby producing a white, tough, semi-rigid polyurethane foam, a fine cellular product.

EXAMPLE V

About 1 part by weight of hydrated silica ($SiO_2 \times H_2O$) and about 1.5 parts by weight of propylene glycol and 1 to 10% sodium carbonate are mixed then heated to just below the boiling point of propylene glycol (150° to 180° C.) while agitating for 30 to 90 minutes at ambient pressure thereby producing brown granules of propylene glycol silicate and poly(propylene glycol silicate) polymer.

About 2 parts by weight of the polyurethane prepolymer as produced in Example I and 1 part by weight of the mixture of propylene glycol silicate and poly(propylene glycol silicate) polymer, containing about 10% water, are mixed then agitated gently for 5 to 15 minutes until the mixture begins to expand. The mixture expands 8 to 12 times its original volume and is cured in 30 to 60 minutes, thereby producing a white, tough, rigid, polyurethane foam, a fine cellular product.

original volume, thereby producing a flexible foam. The product is further cured by heating at 70 degree to 80 degree C. for 3 to 4 hours.

EXAMPLE XIV

About 1 part by weight of a fine granular hydrated silica, 2 parts by weight of castor oil and 1% by weight of sodium hydroxide flakes are mixed when heated to just below the boiling temperature of castor oil while agitating at ambient pressure for 20 to 90 minutes, thereby producing a light brown castor oil silicate polymer.

About 1 part by weight of castor oil silicate polymer is mixed with 0.20 parts by weight of water containing 10% sodium dioctyl suffosuccinate and 1% stannous octoate, and the mixture is then mixed with 2 parts by weight of a polyurethane prepolymer containing 2 parts by weight of toluene diisocyanate (80% 2,4-isomer and 20% 2,6-isomer) and 1 part by weight of polyethylene glycol (450 to 500 molecular weight). The mixture is gently agitated at ambient pressure and temperature for 5 to 15 minutes until the mixture begins to expand. It is then poured into a mold, and the mixture expands 8 to 10 times its original volume, thereby producing a rigid, cream colored, polyurethane fine cellular product.

EXAMPLE XV

About 1 part by weight of the castor oil silicate polymer as produced in Example XIV and 1 part by weight of the polyurethane prepolymer as produced in Example XIV are mixed thoroughly at ambient temperature and pressure. A solid, cream colored polyurethane is produced in 1 to 4 hours.

EXAMPLE XVI

About 2 parts by weight of fine granular hydrated silica, 2 parts by weight of 2-ethyl-2(hydroxymethyl)-1,3-propanediol and 1% potassium hydroxide are mixed. The mixture is heated to just below the boiling point of the mixture while agitating at ambient pressure for 20 to 90 minutes, thereby producing tan granules of 2-ethyl-2(hydroxymethyl)-1,3-propanediol silicate and polymer. About 1 part by weight of said tan granules containing 30% water are added to 2 parts by weight of the polyurethane prepolymer as produced in Example XIV then agitated gently until it begins to expand. The mixture expands 8 to 10 times its original volume, thereby producing a cream colored, rigid, cellular product.

EXAMPLE XVII

About 1 part by weight of a fine granular hydrated silica, 2 parts by weight of granular cane sugar and 10% by weight of sodium carbonate are mixed. The mixture is heated to just above the melting temperature, but below the boiling temperature while agitating at ambient pressure for 20 to 90 minutes, thereby producing brown granules of sugar silicate polymer.

About 1 part by weight of the sugar silicate polymer and 1 part by weight of water are mixed then added to 4 parts by weight of the polyurethane prepolymer as produced in Example XIV. The mixture is gently agitated for 5 to 15 minutes until the mixture begins to expand. The mixture expands 8 to 10 times its original volume, thereby producing a rigid polyurethane fine cellular product.

EXAMPLE XVIII

About 1 part by weight of a fine granular hydrated silica, 2 parts by weight of ethanol and 10% by weight, percentage based on weight of the reactants, of sodium carbonate are mixed then heated to just below the boiling temperatures of ethanol while agitating for 20 to 90 minutes thereby producing a fine granular mixture of ethyl silicate and diethyl silicate.

About 1 part by weight of the mixture of ethyl silicate and diethyl silicate are mixed with 1 part by weight of glacial acetic acid then added to 4 parts by weight of the polyurethane prepolymer as produced in Example XIV. The mixture is gently agitated for 5 to 15 minutes until it begins to expand. The mixture expands 6 to 10 times its original volume, thereby producing a rigid, fine cellular polyurethane product.

EXAMPLE XIX

About 1 part by weight of a fine granular hydrated silica, 2 parts by weight of propanol and 5% by weight of potassium carbonate are mixed then heated to just below the boiling temperature of propanol while agitating at ambient pressure for 20 to 90 minutes, thereby producing a mixture of propanol silicate and dipropanol silicate.

About 1 part by weight of the mixture of propanol silicate and dipropanol silicate is mixed with 0.5 parts by weight of water then mixed with 2 parts by weight of the polyurethane prepolymer as produced in Example IV. The mixture is gently agitated for 5 to 15 minutes at ambient pressure and temperature until the mixture begins to expand. The mixture expands 6 to 10 times its original volume, thereby producing a tough fine, cellular semi-rigid product.

EXAMPLE XX

About 1 part by weight of a fine granular hydrated silica, 2 parts by weight of butanol and 10% by weight of sodium carbonate are mixed then heated in a closed system to just below the boiling temperature of the butanol while agitating at ambient pressure for 20 to 90 minutes, thereby producing a white, granular mixture of butanol silicate and dibutanol silicate.

About 1 part by weight of the mixture of butanol silicate and dibutanol silicate with 0.25 parts by weight of water are mixed with 1 part by weight of the polyurethane prepolymer as produced in Example I and 1 part by weight of the polyurethane prepolymer as produced in Example XIV. The mixture is gently agitated for 5 to 15 minutes until it begins to expand. It expands to about 8 to 12 times its original volume, thereby producing a rigid, fine cellular polyurethane product.

EXAMPLE XXI

About 1 part by weight of a fine granular hydrated silica, 2 parts by weight of isopropyl alcohol (70% alcohol with 30% water) and 10% by weight of sodium carbonate are mixed then heated in a closed system to just below the boiling temperature of the isopropyl alcohol while agitating at ambient pressure for 20 to 90 minutes, thereby producing a white granular mixture of isopropyl alcohol silicate and diisopropyl alcohol silicate.

About 1 part by weight of the mixture of isopropyl alcohol silicate and diisopropyl alcohol silicate containing about 20% by weight of water are mixed with 3 parts by weight of the polyurethane prepolymer as produced in Example I. The mixture is gently agitated for 5 to 15 minutes until it begins to expand. It expands 8 to 12 times its original volume, thereby producing a rigid, fine cellular polyurethane product.

The amount of polyurethane is reduced to only 0.5 parts by weight and then mixed in the same manner, thereby producing a solid, white polyurethane product.

EXAMPLE XXII

About 1 part by weight of fine granular hydrated silica, 3 parts by weight of caprylic alcohol and 10% by weight (percentage based on the weight of hydrated silica and caprylic alcohol of sodium carbonate are mixed then heated to just below the boiling temperature of caprylic alcohol while agitating at ambient pressure for 20 to 90 minutes, thereby producing a mixture of caprylic alcohol silicate and dicaprylic alcohol silicate.

About 1 part by weight of the mixture of caprylic alcohol silicate and dicaprylic silicate is mixed with 1 part by weight of water, containing 10% sodium dioctyl sulfosuccinate. The mixture is mixed with the polyurethane prepolymer as produced in Example XIII in the ratio of 1 to 2 parts by weight, then 0.5 part by weight of resinous extender, coal tar, is added. The mixture is gently agitated for 5 to 15 minutes at ambient pressure and temperature until the mixture begins to expand. The mixture expands 8 to 12 times its original volume thereby producing a semi-flexible fine cellular product.

Other monohydroxy compounds may be used in place of caprylic alcohol such as methyl alcohol, ethyl alcohol, propyl alcohol, isobutyl alcohol, amyl alcohol, hexyl alcohol, octyl alcohol, allyl alcohols, thioalcohols, phenols, cyclohexanol, methylcyclohexanol, benzyl alcohol, cyclohexanomethanol, methallylalcohol, cresols, thiophenols, thiocresols, halogenated alcohols and mixtures thereof.

EXAMPLE XXIII

About 1 part by weight of fine granular hydrated silica, 2 parts by weight of glycolic acid and 10% by weight of sodium carbonate are mixed then heated to just below the boiling temperature of glycolic acid while agitating at ambient pressure for 20 to 90 minutes, thereby producing a gray, granular mixture of glycolic acid silicate and poly (glycolic acid silicate) polymer.

One part by weight of the mixture of glycolic acid silicate and poly (glycolic acid silicate) polymer are mixed with 1 part by weight of water containing 10% sodium dioctyl sulfosuccinate and 3% soap. One part by weight of the catalytic mixture is added to 1 part by weight of the polyurethane prepolymer as produced in Example I and 1 part by weight of the polyurethane prepolymer as produced in Example XIII then gently agitating at ambient temperature and pressure for 5 to 10 minutes until the mixture begins to expand. The mixture expands 4 to 6 times its original volume, thereby producing a semiflexible, white in color, tough, polyurethane fine cellular product.

EXAMPLE XXIV

About 2 parts by weight of malic acid, 1 part by weight of fine granular hydrated silica and 5% by weight of potassium hydroxide are mixed then heated to just below the boiling temperature of malic acid while agitating at ambient pressure for 20 to 90 minutes, thereby producing a granular mixture of malic acid silicate and poly (malic acid silicate) polymer.

The mixture of malic acid silicate and poly (malic acid silicate) polymer is mixed with water in the ratio of 4 to 1 parts by weight then added to a polyurethane prepolymer, produced by reacting a trifunctional polypropylene glycol, having an average molecular weight of about 400, with tolylene diisocyanate to obtain a prepolymer having about 3% NCO groups, in the ratio of 1 to 2 parts by weight, then gently agitated at ambient pressure and temperature for 5 to 15 minutes until the mixture begins to expand, thereby producing a rigid, finely cellular, polyurethane product in 30 to 120 minutes.

Other suitable organic compounds containing hydroxyl and carboxylic radical may be used in place of malic acid such as 10 hydroxy undecanoic acid, 2-hydroxy decanoic acid, 10 hydroxy pentadecanoic acid, monoglycerides of hard fatty acids and mixtures thereof.

EXAMPLE XXV

One part by weight of a fine silica hydrate, 2 parts by weight of 2-chloroethanol and 10% by weight of sodium carbonate and mixed then heated to just below the boiling point of 2-chloroethanol while agitating at ambient pressure for 20 to 90 minutes, thereby producing a white, granular mixture of 2-chloroethanol silicate and di(2-chloroethanol) silicate.

About 1 part by weight of the mixture of 2-chloroethanol silicate and di(2-chloroethanol) silicate, containing 25% water, and 2 parts by weight of a polyurethane prepolymer, prepared by reacting 3 parts by weight of polypropylene glycol (mol weight of 400 to 450) with 2 parts by weight of toluene diisocyanate (HYLENE TM), are mixed then gently agitated for 5 to 15 minutes until the mixture begins to expand, thereby producing a semi-rigid, fine cellular, cured polyurethane product.

EXAMPLE XXVI

One part by weight of the mixture of glycerol silicate and poly (glycerol silicate) polymer as produced in Example I, 2 parts by weight of the mixture of isopropyl silicate and diisopropyl silicate as produced in Example XXI and 1 part by weight of water are mixed.

One part by weight of the said mixture is added to 1.5 parts by weight of a liquid isocyanate terminated polyurethane prepolymer, produced by reacting a polyester resin, containing 4 parts by weight of ethylene glycol, 1 part by weight of propylene glycol and an equimolar amount of adipic acid and has a molecular weight of about 1800, with methylene bis-phenyl diisocyanate. About 0.5 part by weight of dipropylene glycol dibenzoate is added. The mixture is gently agitated for 5 to 15 minutes. The mixture cures after 4 to 12 hours to a solid, non-porous product.

EXAMPLE XXVII

About 1 part by weight of a fine, granular hydrated silica, 2 parts by weight of phenol and 1% to 10% sodium carbonate were mixed then heated to just below the boiling temperature of the phenol while agitating at ambient pressure for 20 to 90 minutes, thereby producing granules of phenol silicate.

About 1 part by weight of phenol silicate is mixed with 10% to 100% by weight of water, based on the weight of phenol silicate and then mixed with 2 parts by weight of a liquid isocyanate-terminated polyurethane prepolymer, which is produced by reacting toluene diisocyanate (80%, 2,4-isomer and 20% 2,6-isomer)

with a trifunctional polypropylene (average mol wt. about 4000) to obtain a trifunctional prepolymer having 2.7% NCO groups. The mixture is gently agitated for 5 to 15 minutes until it begins to expand. The mixture expands 8 to 12 times its original volume, thereby producing a tough, rigid, fine cellular polyurethane product.

EXAMPLE XXVIII

About 1 part by weight of the phenol silicate as produced in Example XXVII and 0.25 parts by weight of water are mixed. The mixture is mixed with 2 parts by weight of a mixture of liquid isocyanate-terminated polyurethane prepolymer, containing 80% to 20% by weight of the prepolymer having three isocyanate groups as produced in Example XXIVII and 20% to 80% by weight of the prepolymer having four isocyanate groups per molecule which is produced by reacting toluene diisocyanate (80% 2,4-isomer and 20% 2,6-isomer) with a tetrafunctional polypropylene glycol (average mol. wt. of about 450 to 500) to obtain a polyurethane prepolymer having about 25% NCO groups. The mixture is gently agitated for 5 to 15 minutes until it begins to expand. The mixture expands 6 to 12 times its original volume, thereby producing a tough, rigid, fine cellular polyurethane product.

Although specific materials and conditions were set forth in the above Examples, these were merely illustrative of preferred embodiments of my invention. Various other compositions, such as the typical materials listed above may be used, where suitable. The reactive mixtures and products of my invention may have other agents added thereto to enhance or otherwise modify the reaction and products.

Other modifications of my invention will occur to those skilled in the art upon reading my disclosure. These are intended to be included within the scope of my invention, as defined in the appended claims.

I claim:

1. The process for curing a liquid isocyanate-terminated polyurethane prepolymer with a mixture of an organic hydroxy silicate compound and polymer to produce a polyurethane product by the following steps:
    (a) adding 1 part by weight of a mixture of an organic hydroxy silicate compound and polymer, produced by heating about 1 part by weight of a fine granular hydrated silica with 1 to 3 parts by weight of an organic hydroxy compound in the presence of an alkali catalyst while agitating for 20 to 90 minutes, to up to 1 part by weight of water;
    (b) admixing 0.5 to 6 parts by weight of a liquid isocyanate-terminated polyurethane prepolymer to the said mixture;
    (c) agitating said mixture for 5 to 15 minutes, thereby
    (d) producing a polyurethane product.

2. The process of claim 1 wherein the organic hydroxy compound is selected from the group consisting of methyl alcohol, ethyl alcohol, propyl alcohol, isopropyl alcohol, butyl alcohol, isobutyl alcohol, amyl alcohol, hexyl alcohol, octyl alcohol, allyl alcohol, caprylic alcohol, thioalcohols, phenol, cresols, thiophenols, cyclohexanol, methylcyclohexanol, benzyl alcohol, cyclohexano-methanol, methallyl alcohol, thiocresols, halogenated alcohols, glycerol, glycerol monochlorohydrin, ethylene glycol, propylene glycol, butylene glycol, trimethylene glycol, tetramethylene glycol, pentamethylene glycol, hexamethylene glycol, diethylene glycol, triethylene glycol, dipropylene glycol, tetraethylene glycol, polyethylene glycol, polypropylene glycol, ether glycols, Bisphenol A, resorcinol, bis(beta-hydroxy-ethyl) terephthalate, 2-ethyl-2-(hydroxymethyl)-1,3-propanediol, pentaerythritol, trimethylol propane, trimethylol ethane, 2,2-oxydiethanol, glucose, mannose, fructose, molasses, cane sugar, dextrines, starches, corn syrup, maple syrup, castor oil, glycolic acid, malic acid, 10 hydroxy undecanoic acid, 2-hydroxy decanoic acid, 10-hydroxy pentadecanoic acid, monoglycerides of hard fatty acids and mixures thereof.

3. The process of claim 1 wherein 1% to 10% by weight based on the weight of the organic hydroxy compound, of the alkali catalyst is used, and the alkali catalyst is selected from the group consisting of sodium carbonate, potassium carbonate, sodium hydroxide, potassium hydroxide and mixtures thereof.

4. The process of claim 1 wherein said liquid isocyanate-terminated polyurethane prepolymer is selected from the group consisting of isocyanate-terminated polyester, isocyanate-terminated polyether, isocyanate-terminated polybutadiene, isocyanate-terminated polysulfide and mixtures thereof.

5. The process of claim 1 wherein from 10% to 50% by weight, based on the weight of polyurethane prepolymer of a resinous extender, selected from the group of resinous extenders consisting of alpha-methylstyrene, mineral oil, coal tar, paraffin oil, sulphonated castor oil, mercapto-terminated liquid polysulfide polymers and mixtures thereof, is added to the polyurethane prepolymer.

6. The process of claim 1 wherein the liquid isocyanate-terminated polyurethane prepolymer is a mixture of at least one liquid polyurethane prepolymer having three free isocyanate groups and at least one liquid polyurethane prepolymer having four free isocyanate groups; reacting said mixture with from 10% to 100% by weight, based on the weight of said mixture, of an organic hydroxy silicate compound and polymer containing 10% to 100% by weight of water, based on the weight of organic hydroxy silicate compound and polymer, by thoroughly mixing for 5 to 15 minutes until the mixture begins to expand, thereby producing a rigid, fine cellular polyurethane product.

7. The process of claim 6 wherein the mixture of polyurethane prepolymers contains from 20% to 80% by weight of the prepolymer having three isocyanate groups and from 80% to 20% by weight of the prepolymer having four isocyanate groups.

8. The process of claim 1 wherein 5% to 50% by weight, based on the weight of the polyurethane prepolymer, of a plasticizer, selected from a group of aromatic esters consisting of a benzoate ester, a phthalate ester, a polyester benzoate or mixture thereof, is added to the polyurethane prepolymer.

9. The process of claim 1 wherein the liquid isocyanate-terminated polyurethane prepolymer is a liquid polyurethane prepolymer having at least three free isocyanate groups per molecule and a molecular weight of 400 to 5000 and is thoroughly mixed with from 10% to 100% by weight, based on weight of polyurethane prepolymer, of a mixture of organic hydroxy silicate compound and polymer containing 10% to 100% by weight of water, based on the weight of organic silicate compound and polymer, then gently agitated for 5 to 15 minutes until the mixture begins to expand, thereby producing a rigid, fine cellular polyurethane product.

10. The process of claim 1 wherein the organic hydroxy compound is an organic polyhydroxy compound.

11. The process of claim 1 wherein the organic hydroxy compound is an organic monohydroxy compound.

12. The product of the process of claim 1 wherein said liquid prepolymer is an isocyanate-terminated polyester.

13. The product of the process of claim 1 wherein said liquid prepolymer is an isocyanate-terminated polyether.

14. The product of the process of claim 1 wherein said liquid prepolymer is an isocyanate-terminated polybutadiene.

15. The product of the process of claim 1 wherein said liquid prepolymer is an isocyanate-terminated polysulfide.

16. The product of the process of claim 1.

17. The process of claim 1, wherein the mixture in step (b) of claim 1 contains from 0.001% to 10% by weight, based on the reaction mixture, of a catalyst selected from the group consisting of tertiary amines, silaamines, tetraalkylammonium hydroxides, alkali metal hydroxides, alkali metal phenolates, alkali metal alcolates, hexahydrotriazines, tin organo-metallic compounds and mixtures thereof.

18. The process of claim 1, wherein the mixture in step (b) of claim 1 contains up to 20% by weight, based on the reaction mixture of a foam stabilizer.

19. The process of claim 1, wherein the mixture in step (b) of claim 1 contains up to 20% by weight, based on the reaction mixture of an emulsifying agent.

20. The process of claim 1, wherein the reaction is accompanied by foaming.

21. The process of claim 1, wherein the mixture contains 5% to 50% by weight, based on the weight of the polyurethane prepolymer, of a filler.

* * * * *